US005585640A

United States Patent [19]
Huston et al.

[11] Patent Number: 5,585,640
[45] Date of Patent: Dec. 17, 1996

[54] GLASS MATRIX DOPED WITH ACTIVATED LUMINESCENT NANOCRYSTALLINE PARTICLES

[76] Inventors: Alan L. Huston, 8501 Fairburn Dr.; Brian L. Justus, 6609 Holford La., both of Springfield, Va. 22152

[21] Appl. No.: 371,306

[22] Filed: Jan. 11, 1995

[51] Int. Cl.⁶ .............................. G01T 1/115; G01T 1/105
[52] U.S. Cl. ................... 250/483.1; 250/337; 250/484.2; 250/484.3; 250/484.4; 250/484.5
[58] Field of Search ................................ 250/337, 483.1, 250/484.2, 484.3, 484.4, 484.5

[56] References Cited

U.S. PATENT DOCUMENTS

| 2,902,605 | 9/1959 | Wallack | 250/337 |
| 5,446,286 | 8/1995 | Bhargava | 250/361 R |

OTHER PUBLICATIONS

Gallagher et al., *J. Cryst. Growth* 138 (1994) 970–975.
Gallagher et al., *J. Mater. Res.*, vol. 10, No. 4, Apr. 1995, 870–876.
Dannhauser et al., *J. Phys. Chem.* 1986, 90, 6074–6076.
Masumoto et al., *Appl. Phys. Lett.* 62(3), 18 Jan. 1993, 225–227.
Luong, *Superlattices and Microstructures*, vol. 4, No. 3 (1988) 385–389.
Borrelli et al., *J. Appl. Phys.* 61(12), 15 Jun. 1987 5399–5409.
Ekimov et al., *Solid State Comm.*, 56, 921 (1985) 921–924.
Bhargava et al., *Physical Review Letters*, vol. 72, No. 3, 17 Jan. 1994, 416–419.
Spanhel et al., *J. Noncrystalline Solids* 147 & 148 (1992) 657–662.
Nasu et al., *Jap. J. Appl. Phys.* 28, (1989) L862–L864.
Justus et al., *Appl. Phys. Lett.* 61(26), 28 Dec. 1992, 3151–3153.
Hendershot et al., *Appl. Phys. Lett.* 63(24), 13 Dec. 1993, 3324–3326.
Peyghambarian et al., in "Optical Characterization and Applications of Semiconductor Quantum Dots" in *Nanostructured Materials: Synthesis, Characterization and Uses*, ed by Edelstein et al., Adam Hilger Pub., 1993, 1–35.
Horan et al., *Phase Transitions*, 1990, vols. 24–26, pp. 605–639.
Wang et al., *Research on Chemical Intermediates*, 15 (1991) 17–29.

*Primary Examiner*—Constantine Hannaher

[57] ABSTRACT

A luminescent glass includes nanocrystalline semiconductor particles, such as ZnS nanocrystals, and an activator, such as copper, for the particles. The glass is made by depositing the nanocrystalline semiconductor particles and the activator within a porous glass matrix, such as 7930 Vycor™ and then thermally activating the glass. The porous glass matrix may be at least partially consolidated or may be allowed to remain porous. The nanometer particle size permits the luminescent glasses of the present invention to be transparent to its luminescent emissions.

21 Claims, 3 Drawing Sheets

GLASS MATRIX DOPED WITH ACTIVATED LUMINESCENT NANOCRYSTALLINE PARTICLES

CROSS-REFERENCE TO RELATED APPLICATIONS

This application is related to commonly assigned U.S. application Ser. No. 08/371,305, (Navy Case No. 76,626) entitled ALL-OPTICAL, RAPID READOUT, FIBER-COUPLED THERMOLUMINESCENT DOSIMETER SYSTEM, filed on even date herewith by Huston and Justus, the entirety of which is incorporated by reference herein for all purposes.

BACKGROUND OF THE INVENTION

1. Field of the Invention

The present invention relates generally to luminescent glasses, and more specifically to glasses doped with nanocrystalline semiconductor particles and an activator for luminescence.

2. Description of the Background Art

The luminescence of bulk semiconductor and insulator materials (herein generally referred to as inorganic solids) has been intensively studied for decades. The nature of the luminescent centers in these materials can be broadly classified into several categories, 1) emission due to recombination of electron-hole pairs; 2) exciton emission; 3) broadband emission due to impurities with filled electronic shells; and 4) narrowband emission due to impurities with incomplete electronic shells, such as transition metal and rare earth ions. The impurity atoms and ions are referred to as activators (and/or co-activators if more than one impurity is required). Luminescent inorganic solids, particularly those activated by added impurities, are known as phosphors. There are countless important commercial and military applications for a wide variety of phosphor materials. A brief (and necessarily incomplete) list of phosphor applications follows:

1) Cathodoluminescence

Cathodoluminescent phosphors are used in cathode ray tubes (CRT's), including television sets, radar screens and oscilloscope displays. Typical cathodoluminescent phosphors are sulfides of cadmium and zinc. The colors emitted by a color television screen are due to the interaction of accelerated electrons with phosphors activated with impurities selected for the frequency (color) of their luminescence.

2) Electroluminescence

Electroluminescence is the generation of light upon the application of an electric field across a material. The applications for electroluminescent phosphors are numerous, including, for example, lighting and display technologies.

3) Thermoluminescence

Thermoluminescent phosphors emit light when heated. Emission occurs due to the release (detrapping) of trapped electrons that result from prior excitation of the phosphor using ultraviolet (UV) or ionizing radiation. Thermoluminescent materials are used as dosimeters to monitor the exposure of personnel and equipment to high energy ionizing radiation.

4) Radioluminescence

Radioluminescent phosphors emit light upon exposure to high energy ionizing radiation and are often referred to as radiation scintillators. Inorganic scintillators are used to detect the presence of ionizing radiation in many venues including monitoring of the environment and the protection of personnel at nuclear installations.

5) Sensitized Luminescence

Infrared (IR) stimulable phosphors emit visible light upon exposure to infrared radiation. This emission occurs due to the migration and recombination of trapped electrons which previously formed upon excitation of the phosphor by UV radiation. These phosphors are similar in principle to the thermoluminescent phosphors in that the excitation energy of the UV radiation is stored (trapped) in the phosphor. These phosphors have many applications including, for example, the detection and imaging of IR radiation, and optical data storage.

Many of the inorganic solid phosphors used in the applications cited above are available only as polycrystalline powders with particle dimensions ranging from one to tens of microns. An intensive area of research for literally decades has been the search for improvements in the structure and form of the phosphors. Attempts to grow single crystal phosphors, thin film phosphors, or phosphors embedded in glass have met with varying degrees of success. To better illustrate the motivation for these efforts, consider a typical polycrystalline phosphor, available as a powder with particle dimensions of 1 µm or greater. Large crystals often cannot be grown due to the very high melting point of the inorganic solid and the presence of the activator metal ions. The powder appears white when illuminated with visible light due to the highly efficient scattering caused by the small particles. Because of the efficient scatter, the phosphor powder is not transparent to its own luminescence. For this reason, the phosphor must be used in a very thin layer or its luminescence would be effectively attenuated. A final disadvantage of the powder phosphor is its mechanical fragility. It must be protected somehow and usually cannot withstand high temperatures, hostile chemical environments, or abrasions. Severe limitations are often placed on the functionality of the phosphor due to the inability to manufacture the material in a transparent state. The problems cited above are not unique to any one application, but are shared by many phosphors in many applications. Even in those cases where it is possible to grow the phosphor in a single crystal, many problems remain. The crystals may be mechanically fragile or susceptible to thermal shocks. Some crystals are hygroscopic, or cannot withstand even mildly corrosive chemical environments. Some phosphors become health hazards as they age due to the diffusion of toxic materials out of the crystal.

In order to avoid some of these difficulties, researchers have worked to incorporate polycrystalline phosphors into glass matrices. Historically, two basic approaches have been used. Attempts were made to grow phosphor nanocrystals from the substituent inorganic material and activators) by diffusive precipitation from a glass melt as a result of striking (heat treating) the glass. This approach did not meet with success since the activator ions are usually quite soluble in the glass matrix and prefer to remain in the glass rather than precipitate out with the crystal. The second technique has been to embed the micron-sized crystalline phosphors in a glass (or polymer) matrix, Although polycrystalline phosphors have been incorporated in this way in both low-melting glass and polymer hosts, the optical problems (scattering) associated with the micron sized particles are not improved.

B. Nanocrystalline Inorganic Solids

Nanometer-sized crystals of inorganic solids, and, in particular, semiconductors, have been intensively studied over the past decade due to the interest in the basic physical properties of the nanocrystals and their potential uses in electronic and optical devices. The effects of the small dimensions on the physical properties are often referred to as quantum confinement effects and the nanocrystals themselves are often referred to as quantum dots.

Several techniques have been developed to grow or deposit semiconductor quantum dots in glass matrices. Nanocrystals of both I–VII and II–VI semiconductors have been grown in aluminoborosilicate glasses using the diffusive precipitation method described above. II–VI semiconductor quantum dots have been prepared using a variety of sol-gel glass fabrication methods as well as radiofrequency (rf) sputtering methods. II–VI semiconductor quantum dots have been deposited into porous Vycor™ (Corning, Inc) glass using precipitation reactions as well as metalloorganic chemical vapor depositions (MOCVD or CVD) methods, III–V semiconductor quantum dots have also been prepared in porous Vycor™ glass using several CVD techniques.

Previous studies of semiconductor quantum dots have predominantly focused on the optical properties, and, in particular, the nonlinear optical properties of the quantum dots. The materials processing issues have concerned the purity (stoichiometry) of the quantum dots, the crystal size and distribution, and the crystallinity. Luminescence from semiconductor-doped glasses, such as commercially available cadmium sulfide/selenide glasses, has been measured at room temperature. The luminescence appears as a narrow feature near the band edge, attributed to direct recombination, and a broad, less intense red-shifted band attributed by various authors to shallow surface related traps or defects. The luminescent features were found to be dependent on the stoichiometry of the semiconductor. Exciton and biexciton luminescence from CuCl quantum dots has been observed at low temperatures (T≦108 K.) and lasing due to the biexciton to exciton transition has been reported, also at 77 K.

There have been no successful prior efforts to develop activated nanocrystalline phosphors within a glass matrix, followed by appropriate heat treatment.

SUMMARY OF THE INVENTION

It is an object of the present invention to form a transparent composite of phosphors distributed in a glass matrix.

It is another object of the present invention to provide mechanically and chemically stable phosphors.

It is a further object of the present invention to form a glass matrix doped with inorganic, luminescent nanocrystals.

These and other objects are achieved by doping a glass with inorganic nanocrystals including an activator for the nanocrystals. Typically, fabrication is accomplished by deposition of the activator and nanocrystalline semiconductor particles into a porous glass matrix.

BRIEF DESCRIPTION OF THE DRAWINGS

A more complete appreciation of the invention will be readily obtained by reference to the following Description of the Preferred Embodiments and the accompanying drawings, wherein.

DESCRIPTION OF THE PREFERRED EMBODIMENTS

Figure 1:
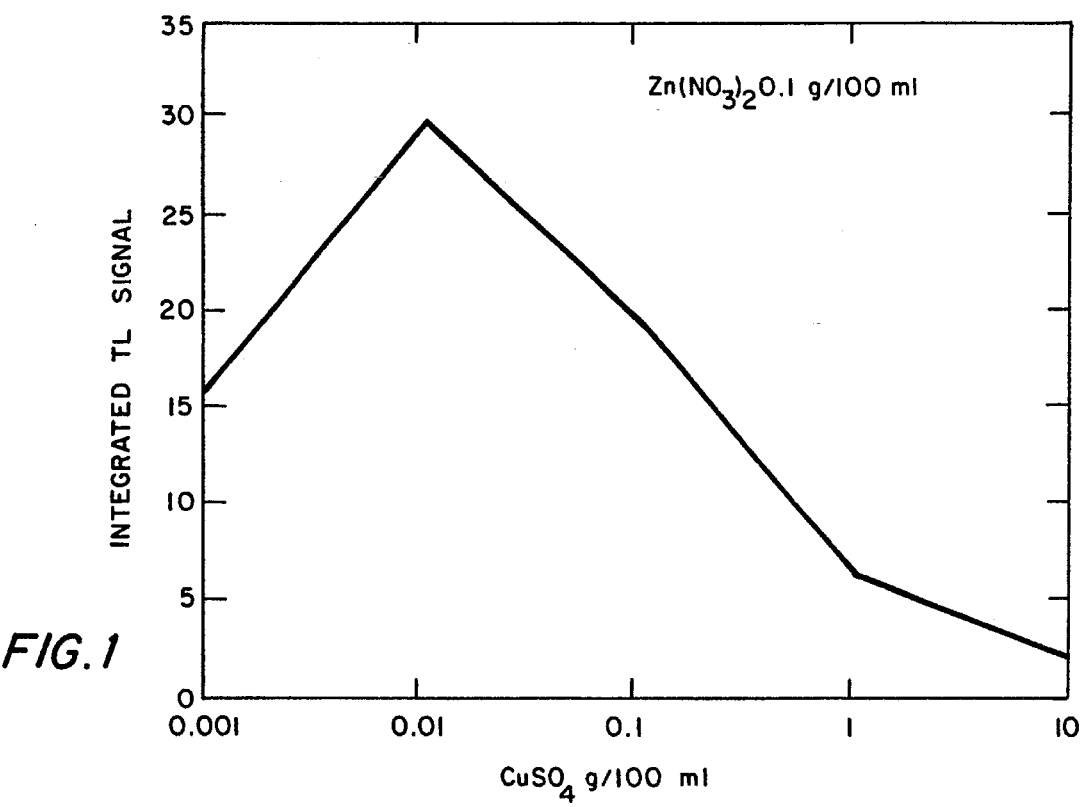
FIG. 1 shows the thermoluminescence signal as a function of copper sulfate concentration for a sample made according to the procedures of Example 1, but with varying concentrations of copper sulfate in the copper sulfate doping solution. The solid line shows the fluorescence excitation, while the dotted curve shows the fluorescence emission.

The nanocrystalline inorganic solid/glass composite phosphors are fabricated by deposition of the inorganic solid and the activators within a porous glass matrix. The deposition can be accomplished using known chemical methods for doping glasses, such as, for example, precipitation from a liquid phase solution, or CVD. Often, the most convenient method will be precipitation from a liquid phase solution. The exact deposition process used and the parameters employed for deposition are not critical, provided that the deposited materials are nanocrystalline and the glass retains its porosity. Generally, the size of the deposited crystals is controlled by the pore size of the glass into which the crystals are deposited. The pores restrict the growth of the deposited crystals so that the deposited crystals have a diameter smaller than that of the pore in which they precipitate. However, the pores in a porous glass are in reality tortuous channels, sometimes interconnected, which behave like pores. Thus, if the concentration of the dopants within the glass becomes too great for the average effective pore size, the nanocrystals will grow through the channels, interconnect, and develop into large crystals that reduce the transparency of the glass.

Following the deposition of the inorganic solid and activators, a thermal heat treatment may be used to promote diffusion of the activators in the nanocrystals and to control the nature and quality of the crystalline phase. This heat treatment is performed at a temperature sufficient to substantially enhance diffusion of the activators. Typically, the activation temperature is also selected to partially, or perhaps even fully, consolidate the porous glass. If desired, the porous glass can be activated at a temperature below that needed to consolidate the glass. The activation temperature, however, should not be so high as to liquify the glass. For 7930 Vycor™ glass (Corning, Inc.), an activation temperature of typically from about 800° to about 1100° C. may be used. The activation temperature must be below the melting temperature of the glass. Annealing, i.e., accompanied by at least partial consolidation of the glass (collapsing of at least some of the pores), requires temperatures above the $T_g$ of the glass.

The time for activation may be varied depending upon what, if any, degree of consolidation is required. While the order in which the components are mixed is not critical, all components of the glass, must be present-during the activation step.

Suitable porous glasses are amorphous matrices with densely packed, tortuous, nanometer-sized, interconnecting pores or channels. The exact chemical compositon is not critical. One example of such a glass is porous Vycor™ (Corning, Inc.). Vycor™ glass is a 96% silica glass obtained by heat treating a borosilicate glass to separate the boron and silicate phases and then subjecting the heat treated glass to an acid etch, thereby removing most of the boron phase and leaving the porous 96% silica glass. The Vycor™ glass can be obtained in a wide variety of sizes or shapes, including sheets, rods, tubes, and irregular shapes. Suitable porous glass hosts can also be prepared using well-known sol-gel glass technology. These glasses are prepared by the acid catalyzed or base catalyzed hydrolysis of metallic esters or alkoxides. Single component or multiple component glasses can be prepared and include, for example, silicate, titanate, germanate and zirconate glasses. The pore size, distribution of pore sizes and the density of the pores in the sol-gel glass can be controlled by the hydrolysis conditions and by the details of the drying procedure. The porous sol-gel glasses may also be manufactured in a wide variety of shapes and sizes as well as in thin films. Porous glass matrices that may be made by the sol-gel process include pure $SiO_2$, pure $Al_2O_3$ (alumina glass), pure $TiO_2$ and mixtures thereof in varying proportions to provide glasses with varying properties.

In the starting glasses to be doped with nanocrystalline semiconductor particles (nanocrystals) and at least one activator therefor, the pores typically average about 10 to about 100 Å in diameter, more often about 40 to about 75 Å in diameter and most often about 40 to about 50 Å in diameter. Vycor glass™ (Corning 7930) has an average pore size of about 40 Å diameter. Average pore sizes of less than 40 Angstrom diameter can be obtained using sol-gel derived glasses. Average pore sizes of less than 10 Å diameter are not practical because it is difficult to diffuse solutions into the pores. Average pore sizes that are larger than 100 Å in diameter may be too large to assure nanocrystal formation, depending on the concentration of the activator and semiconductor employed. The optical quality of glasses prepared from larger pore sizes is diminished. Additionally, the size distribution of the particles should be selected to maintain the transparency of the glass to its own luminescent emissions. To this end, the activator should preferably not form particles having diameters greater than about 100 Å. Particles having a diameter of greater than 100 Å may reduce the transparency of the glass matrix, and thus their presence within the glass should be minimized.

A pore density of 25 to 30 volume percent is ideal because it allows for the formation of isolated and separated nanocrystalline structures. If the void volume is too high, the semiconductor crystallites may be too close together and merge to form particles larger than nanocrystals. Lower pore densities simply reduce the amount of semiconductor material that can be introduced to the glass. This situation may be desirable for certain applications such as doped fiber-optic cables.

The nanocrystalline nature of the semiconductor particles in the material of the present invention is critical. Because of the small size of nanocrystals, glass doped therewith maintains its transparency. If the nanocrystals are sufficiently small (below about 80 Å, with a narrow size distribution so that few, if any particles are more than 120 Å) they may become quantum-confined. The effects of this quantum confinement are favorable in many circumstances, although quantum-confined semiconductor particles are not required to obtain many benefits of the present invention.

The selection of suitable inorganic solid phosphor materials to be deposited in porous glass in an effort to fabricate nanocrystalline phosphor/glass composites is guided by previous knowledge about the most useful and efficient bulk phosphors. There have been literally thousands of different types of phosphors manufactured using many combinations of inorganic solids and activators. Some of the most useful phosphors are sulfides of zinc or alkaline earths such as calcium, magnesium and strontium, activated with transition metal or rare earth ions. Activated ZnS phosphors have found wide utility in a variety of applications including cathodoluminescence, radioluminescence, electroluminescence, and IR sensitivity. Different activators and/or co-activators have been identified and their relative concentrations optimized for the desired application. For example, useful ZnS phosphors have been manufactured using activators and co-activators (when required) selected from the following: rare earth ions, silver, copper, lead, chloride, and manganese ions. This list is by no means complete.

Sufficient activator or (activator/co-activator) should be employed in the glass to provide an activator concentration effective to luminescently activate the semiconductor nanocrystals, i.e., render the nanocrystalline semiconductor particles capable of emitting light in the visible or infrared range in response to electronic excitation at an appropriate wavelength.

Figure 2:
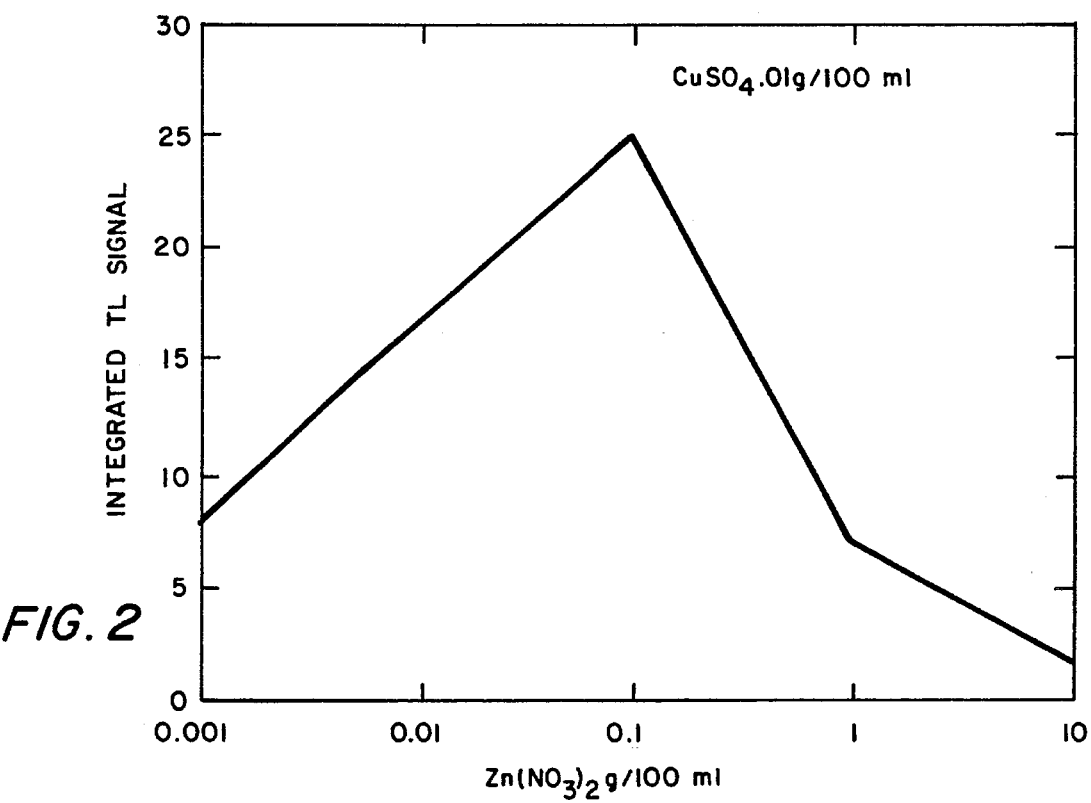
FIG. 2 shows the thermoluminescence signal as a function of zinc nitrate concentration for a sample made according to Example 1, but with varying concentrations of zinc nitrate in the zinc nitrate doping solution.

The concentrations and identities of the dopants result in different physical and optical properties of the nanocrystalline semiconductor doped glass. For example, copper activated zinc sulfide glasses display the following trends:

increasing the concentration of copper sulfate in the doping solution from zero to approximately 0.1 gram in 100 cubic centimeters of water shows an increase in thermoluminescence with increasing copper concentration. As the concentration of copper is increased further, the thermoluminescence intensity decreases (FIG. 1).

high concentrations of ZnS lead to a decrease in the thermoluminescence emission from the glass (FIG. 2).

Figure 3:
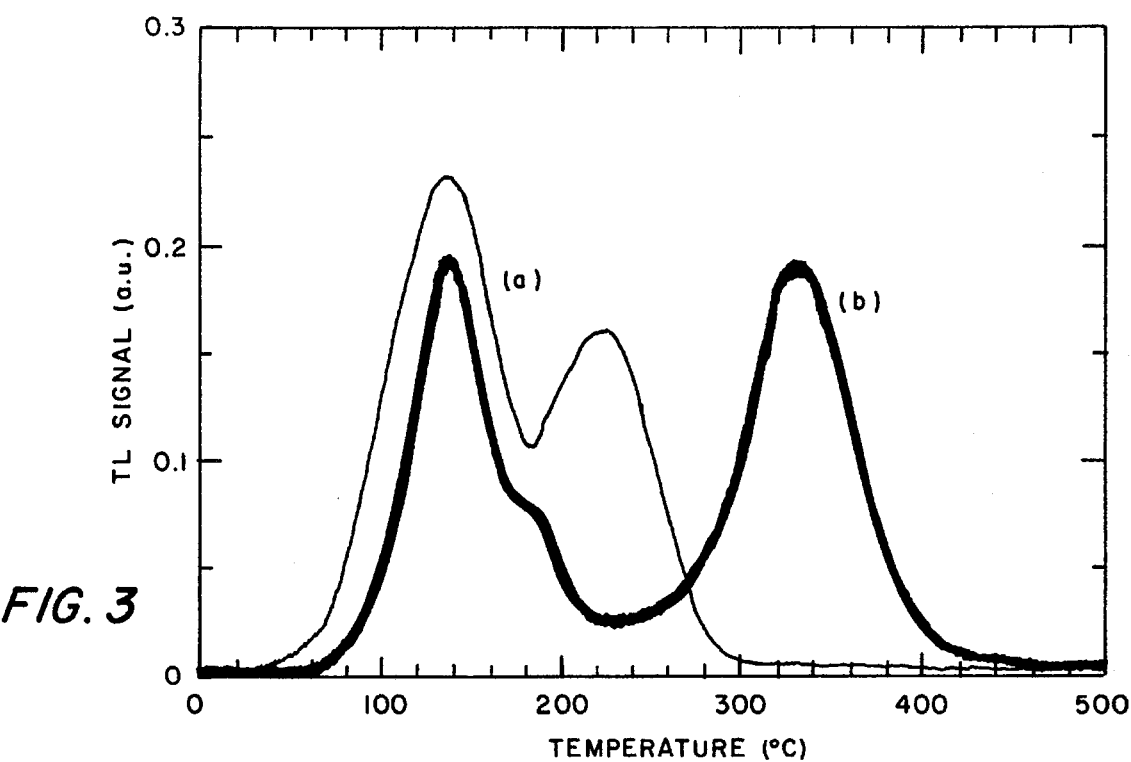
FIG. 3 shows the effect of ZnS concentration on the positions of the thermoluminescence glow peaks. Curve (a) shows the typical thermoluminescence observed at low concentrations (corresponding to 1 g/100 ml zinc nitrate in the doping solution) of copper activated (1 mg Cu/ml doping solution) ZnS nanocrystals in Vycor™ glass, while curve (b) shows the growth of a higher luminescent glow peak in a higher concentration (corresponding to 10 g/100 ml zinc nitrate in the doping solution) of copper activated (1 mg Cu/ml doping solution) ZnS nanocrystals in Vycor™ glass.

Intermediate concentrations of ZnS lead to thermoluminescent glow peaks at higher temperatures (FIG. 3).

These tendencies may be characteristic of all doped glass compositions according to the present invention. At low concentrations, increasing dopant levels increase the number of luminescent crystals, thus increasing the overall luminescence. As the concentration of the activator and/or semiconductor becomes too high, the crystals grow too large and the glass loses transparency and luminescence. At intermediate concentration of semiconductors, the luminescent nanocrystalline semiconductors particles may communicate with each other, slightly changing their electronic energy levels and characteristic spectra. Also, to maintain the transparency of the glass to its own fluorescence, the number of activator particles having a particle diameter greater than about 100 Å should be minimized in the glass. It may even be desirable to avoid the formation of any activator particles having a diameter of greater than about 100Å. Possibly, but not necessarily, the activator may substitute into the crystal lattice of the nanocrystalline semiconductor particles. However, activation might be the result of proximity effects between the activator and the nanocrystalline semiconductor particles.

The activated nanocrystalline inorganic solid phosphors of this invention may be manufactured, for example, from type II–VI semiconductors, of which ZnS is an example, type III–V semiconductors, of which gallium arsenide is an example, type IV—IV semiconductors, of which silicon is an example, alkali halides, of which potassium chloride is an example, or alkaline earth sulfides, of which calcium sulfide is an example. The activator and/or co-activator ions can be chosen from the rare earth metals, of which europium is an example, or the transition metals, of which manganese is an example. Co-activators also often include halogen ions, of which chloride is an example. The use of europium as an activator results in a mixed blue and red luminescence.

Doped glasses according to the present invention can exhibit cathodoluminescence, electroluminescence, thermoluminescence, radioluminescence or sensitized luminescence. The emission of light after excitation can be immediate or delayed (energy trapping). The exact type of luminescence observed will depend, in a characteristic way, upon the semiconductor and activator used, as well as the concentration of those materials within the glass. The type of luminescence observed depends on the excitation conditions. The chemistry of the phosphor may be manipulated and predicted to enhance a particular type of luminescence.

The following is a generalized exemplary procedure for making a doped glass according to the present invention. The purpose of this generalized procedure is illustrative only. Although the doping method illustrated is precipitation from solution, it should be understood that other doping methods, dopants and porous glasses may be used.

In a typical doping procedure, a piece of porous glass, such as porous Vycor™ glass, is immersed in an aqueous solution of a water soluble metal salt such as zinc nitrate. The solution is allowed to diffuse completely throughout the porous glass. The metal salt solution concentration can range between zero and the solubility limit of the salt (1.8 grams per cubic centimeter of water for zinc nitrate). If a metal sulfide dopant, such as zinc sulfide, is desired it may be formed in situ, for example, by the addition of an aqueous solution of thioacetamide to the solution of the water-soluble salt. The thioacetamide/metal salt solution reaction proceeds for a period of time ranging from one hour to several days, depending on the temperature of the solution. A lower temperature (about 25° C. to about 50° C.) results in a slower reaction and assures a uniform distribution of metal sulfide throughout the porous glass piece. An alternative method for producing a metal sulfide is to expose the metal doped glass piece to hydrogen sulfide ($H_2S$) gas for a period of approximately one hour. The $H_2S$ gas diffuses quickly throughout the porous glass and reacts with the deposited metal salt. The porous glass, containing the desired dopant is next immersed in an aqueous solution of metal salt activator, such as copper sulfate or europium chloride. The concentration of the metal salt activator can range between zero and the solubility limit of the salt (approximately 0.4 grams per cubic centimeter for copper sulfate, although no enhancement beyond about 0.2 g ml is observed in the case of copper sulfate). This solution is allowed to diffuse throughout the porous glass, typically at about room temperature. The glass is then dried slowly, over a period of one hour, to prevent cracking of the glass.

The temperature is raised slowly (several hours) to approximately 300 degrees centigrade and then the temperature is increased more rapidly (one hour) to typically no greater than about 1100° C.–1150° C. The glass is maintained at high temperature for a period of three to 24 hours to fully activate the glass phosphor. The glass is cooled to room temperature over a period of one to three hours. The resulting glass is highly luminescent when exposed to radiation wavelengths that overlap the absorption band of the doped, activated glass. For ZnS activated with copper, exposure to ultraviolet wavelengths of less than 300 nm, results in an intense blue-green luminescence.

Having described the invention, the following examples are given to illustrate specific applications of the invention including the best mode now known to perform the invention. These specific examples are not intended to limit the scope of the invention described in this application.

EXAMPLES

Example 1—Zinc Sulfide/Copper Doping 0.1 g of zinc nitrate hexahydrate were dissolved in 100 ml distilled water. To the resulting solution were added 1 cc concentrated nitric acid. 1 g of porous Corning 7930 Vycor™ glass were then added to the acidified solution, in which it was allowed to remain for 1 to 2 hours to allow complete diffusion of the zinc nitrate solution throughout the glass. The glass was then removed from the solution and dried.

A thioacetamide solution was prepared by dissolving 1.0 g thioacetamide in 100 ml distilled water, adding 1 ml concentrated nitric acid. The thioacetamide solution was then placed in a constant temperature bath set to 30° C. The dried zinc-loaded porous glass was then placed into the sulfide solution and allowed to react therewith for at least 10 hours to form nanocrystalline ZnS. The porous glass sample was then removed from solution and dried.

0.01 g copper sulfate was dissolved in 100 ml water. The zinc sulfide-containing glass sample was then placed in the copper sulfate solution and allowed to remain there for 1 to 2 hours to allow complete diffusion of the copper sulfate solution throughout the porous glass. The copper doped zinc sulfide glass sample was then removed from the copper sulfate solution and dried.

The dried zinc sulfide/copper-doped porous glass was then placed in an oven at room temperature. The oven temperature was then increased at a rate of about 1° C./minute up to a temperature of 300° C. Over the course of an next hour, the temperature of the oven was then raised to 1150° C. The sample was baked at 1150° C. for at least 3 hours and then allowed to cool to room temperature (Cooling may occur either by shutting off the oven and allowing the sample to cool within, or by removing the sample from the oven).

Figure 4:
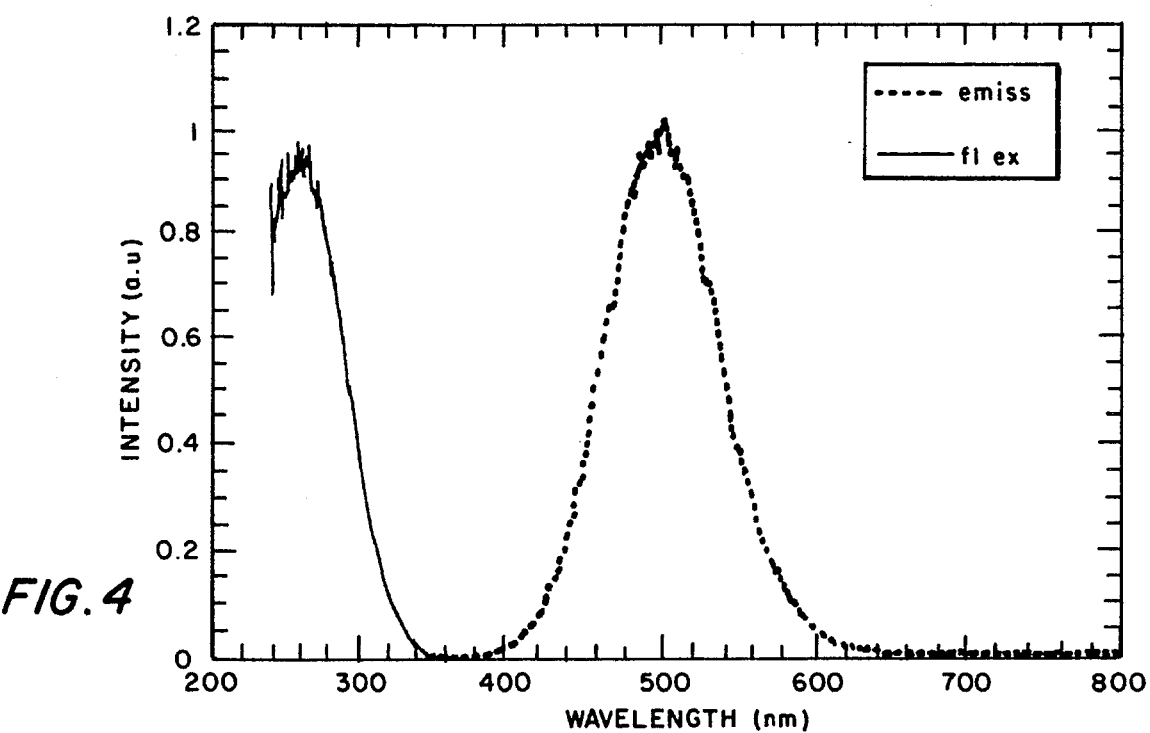
FIG. 4 shows the excitation and emission spectra of a copper activated ZnS/Vycor™ glass composite phosphor made according to Example 1.

The absorption spectrum of the ZnS phosphor glass exhibited a maximum at approximately 260 nm, with a broad tail extending to approximately 320 nm. This absorption feature was characteristic of excitonic absorption within ZnS nanocrystallites (quantum dots). The location of the absorption peak reflected the blue shift of the exciton energy due to quantum confinement of the excitons. The width of the absorption feature reflected the size distribution of the quantum dots in the glass composite. After excitation of the nanocrystalline phosphor by the UV light, transfer of the energy to the copper ion activators occurs. Emission occurs from the excited copper ions. The emission is characterized by a broad band centered at approximately 500 nm, similar to that from a bulk copper activated ZnS phosphor. The quantum efficiency of the emission is also similar to that of the bulk phosphor. The temporal decay of the emission is faster than that of the bulk phosphor emission. FIG. 4 shows the emission and fluorescence excitation spectra of a sample of the copper activated ZnS quantum dot phosphor composite. The solid curve was obtained by scanning the optical excitation source from 240 nm to 350 nm and monitoring the total emission. The heavy dashed curve is the emission curve obtained by exciting the sample at 266 nm. An elemental analysis of the sample indicated that the individual concentrations of zinc sulfide and copper were less than 5 ppm.

Example 2—KCl Activated with Europium Ions, Manufactured in Porous Vycor Glass

The procedure used in Example 1 was used, except that the glass was directly doped using a solution of 1 g KCl in 100 ml of water followed by doping with 1 g EuCl solution in 100 ml of water. No sulfides were used.

Figure 5:
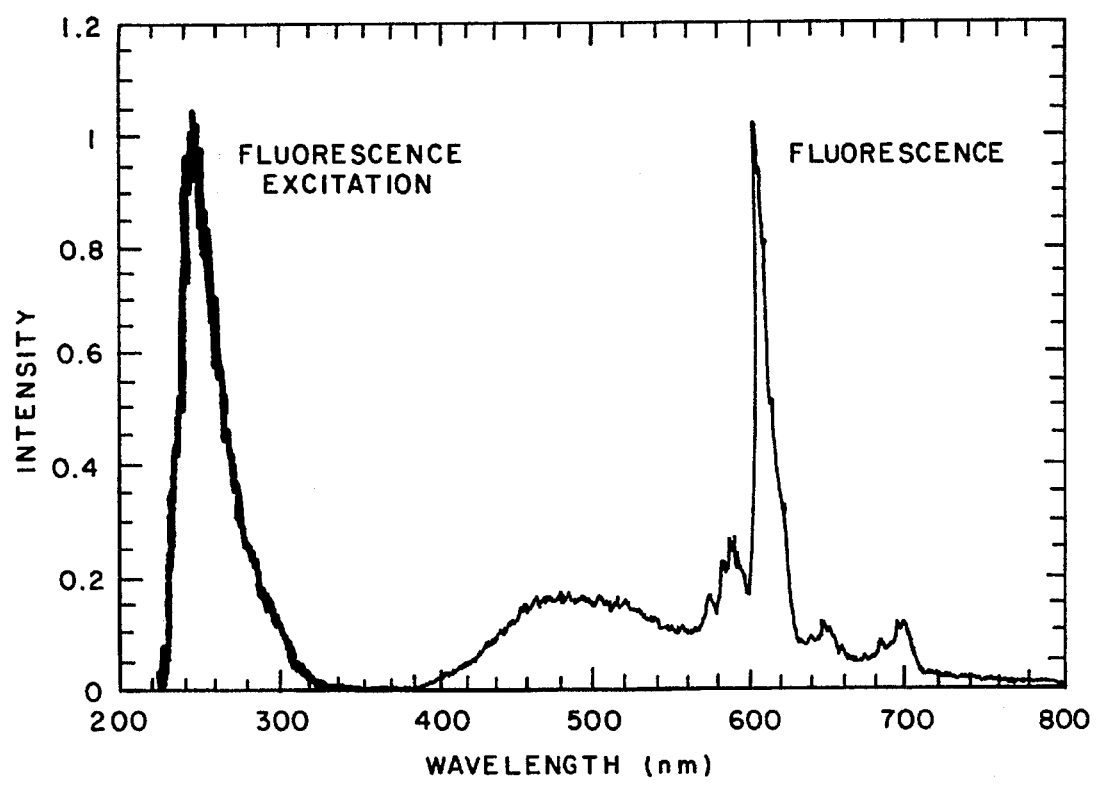
FIG. 5 shows the excitation and emission curve of a europium activated KCl/Vycor™ glass composite phosphor made according to Example 2.

The absorption spectrum of the KCl phosphor glass exhibited a maximum at approximately 240 nm, with a broad tail extending to approximately 300 nm. This absorption feature was characteristic of absorption by europium ions within the crystal lattice of the alkali halide. The location and width of the absorption peak reflect the nature and the influence of the crystalline host environment seen by the europium ions. After excitation of the nanocrystalline phosphor by the UV light, emission occurs from the excited europium ions. The emission is characterized by a broad band centered at approximately 450 nm due to emission from $Eu^{+2}$ ions, in addition to a narrow peak at 615 nm due to $Eu^{+3}$ emission. The emission and fluorescence excitation spectra are shown in FIG. 5. The heavy solid curve was obtained by scanning the optical excitation source from 224 nm to 350 nm and monitoring the total emission. The light solid curve is the emission spectrum obtained by exciting the sample at 266 nm.

Obviously, many modifications and variations of the present invention are possible in light of the above teachings. It is therefore to be understood that, within the scope of the appended claims, the invention may be practiced otherwise than as specifically described.

What is claimed is:

1. A luminescent glass comprising:
    a glass matrix doped with nanocrystalline semiconductor particles;
    an activator, within said glass matrix, for said nanocrystalline semiconductor particles, said activator being present in a concentration effective to luminescently activate said nanocrystalline semiconductor particles, said glass being transparent to its luminescent emissions.

2. The luminescent glass of claim 1, wherein said glass emits light in the visible or infrared spectrum immediately after absorption of radiation.

3. The luminescent glass of claim 1, wherein said glass, upon absorption of radiation, forms trapped electrons, and emits light in the visible or infrared spectrum after upon detrapping of said trapped electron.

4. The luminescent glass of claim 3, wherein said glass detraps said electron upon heating.

5. The luminescent glass of claim 3, wherein said glass detraps said trapped electrons upon exposure to infrared radiation.

6. The luminescent glass of claim 1, wherein said nanocrystalline semiconductor particles are selected from the group consisting of II–VI and III–V semiconductors.

7. The luminescent glass of claim 6, wherein said nanocrystalline semiconductor particles are selected from the group consisting of ZnS and GaP, and wherein said activator is a transition metal ion, a rare earth ion, or a halide ion.

8. The luminescent glass of claim 7, wherein said activator is $Cu^{+1}$ or a $C^-$.

9. A method of producing a luminescent glass that is transparent to its luminescent emissions, comprising the steps of:
    doping a porous glass matrix with nanocrystalline semiconductor particles, such that said nanocrystalline semiconductor particles in said glass have a size distribution that does not significantly reduce the transparency of the luminescent glass to its luminescent emissions;
    adding to said porous glass matrix an amount of a activator effective to luminescently activate said nanocrystalline semiconductor particles, such that the said activator within said glass does not significantly reduce the transparency of the luminescent glass to it luminescent emissions;
    activating said nanocrystalline semiconductor particles within said glass by heating said porous glass matrix having said activator and said nanocrystalline particles therein to a temperature of from about 800° C. to below a temperature at which said porous glass matrix melts.

10. The method of claim 9, further comprising the step of at least partially collapsing said porous glass matrix after said doping and adding steps.

11. The method of claim 9, wherein said porous glass matrix has an average pore size of about 10 to 100 Å in diameter before said doping and adding steps.

12. The method of claim 11, wherein said porous glass matrix has an average pore size of below about 80 Å before said doping and adding steps.

13. The method of claim 12, wherein said porous glass matrix has an average pore size of about 40 to about 50 Å before said doping and adding steps.

14. The method of claim 13, wherein said porous glass matrix has an average pore size of about 40 to about 50 Å before said doping and adding steps.

15. The method of claim 9, wherein said glass matrix is doped with said nanocrystalline semiconductor particles by precipitating said nanocrystalline semiconductor particles from a solution in which said glass matrix is immersed.

16. The method of claim 15, wherein said activator is added to said glass matrix by precipitating said activator from a solution in which said glass matrix is immersed.

17. The method of claim 9, wherein said glass matrix is doped with said nanocrystalline semiconductor particles by chemical vapor deposition.

18. The method of claim 17, wherein said glass matrix is doped with said nanocrystalline semiconductor particles by metalloorganic chemical vapor deposition.

19. The method of claim 9, wherein said glass matrix is doped with said nanocrystalline semiconductor particles by steps comprising:
    immersing said porous glass matrix into a solution comprising a metal salt;
    converting said metal salt to a metal chalcogenide dopant by exposing said metal salt to gaseous $H_2S$, $H_2Se$ or $H_2Te$.

20. The method of claim 19, wherein said metal salt is a metal halide and is converted to a metal sulfide by exposure to gaseous $H_2S$.

21. A luminescent glass made according to the method of claim 9.

* * * * *

UNITED STATES PATENT OFFICE
CERTIFICATE OF CORRECTION

PATENT NO.  : 5,585,640
DATED       : December 17, 1996
INVENTOR(S) : Huston et al It is certified that error appears in the above-identified patent and that said Letters Patent is hereby corrected as shown below:

Title page, insert item [73]
Assignee:  The United States of America as represented by
           the Secretary of the Navy. Washington D.C.

Signed and Sealed this

Eleventh Day of April, 2000

Attest:

Q. TODD DICKINSON

Attesting Officer

Director of Patents and Trademarks